United States Patent
Wideman

(10) Patent No.: US 8,743,501 B2
(45) Date of Patent: Jun. 3, 2014

(54) TAPE LIBRARY INITIATED ACTIONS

(76) Inventor: Roderick B. Wideman, Shakopee, MN (US)

( * ) Notice: Subject to any disclaimer, the term of this patent is extended or adjusted under 35 U.S.C. 154(b) by 349 days.

(21) Appl. No.: 13/171,880

(22) Filed: Jun. 29, 2011

(65) Prior Publication Data

US 2013/0003222 A1 Jan. 3, 2013

(51) Int. Cl.
*G11B 19/02* (2006.01)
*G06F 12/00* (2006.01)

(52) U.S. Cl.
USPC .............................. 360/69; 711/111; 711/154

(58) Field of Classification Search
None
See application file for complete search history.

(56) References Cited

U.S. PATENT DOCUMENTS

| | | | | |
|---|---|---|---|---|
| 7,277,247 | B2* | 10/2007 | Hoshino | 360/69 |
| 2008/0222344 | A1* | 9/2008 | Upadhyayula | 711/4 |
| 2009/0292798 | A1* | 11/2009 | Basham et al. | 709/223 |
| 2011/0188148 | A1* | 8/2011 | Inai et al. | 360/69 |

* cited by examiner

*Primary Examiner* — Andrew L Sniezek

(57) ABSTRACT

Example apparatus and methods concern a tape library that can initiate an action. One example method may include controlling a tape library to perform a media scanning operation associated with an extended data life management policy. The extended data life management operation may be associated with an application representation of tape drives, slots, and tapes on the tape library. The method may include determining a result of the media scanning operation and selectively controlling the tape library to either provide status or to issue a command based on the result. In one example, conventional status may be returned when a media scan operation result (e.g., tape scan) indicates the tape is fine while a command may be issued when the result indicates the tape may need to be fixed, copied, or replaced.

4 Claims, 9 Drawing Sheets

TAPE LIBRARY INITIATED ACTIONS

BACKGROUND

A tape library has physical tape drives, physical slots, and computerized processes that process physical tapes. Conventionally, a tape library has been a target for commands from applications. In response to these commands, the tape library may provide requested data and/or limited information (e.g., status, error signal, capacity information, tape health information). FIG. 1 illustrates a conventional application 100 providing commands to a conventional tape library 110 and receiving data and status in return.

One example tape library is a Scalar I40 tape library, which is a rack-mountable library that uses the LTO (linear tape open) Ultrium 4 recording standard and has a serial attached SCSI (small computer system interface) interface. The I40 may store up to 40 TB on up to 25 removable media which may be, for example, LTO Ultrium media that can store up to 1.6 TB. The I40 may be configured with a display and with a bar code reader.

FIG. 2 illustrates that, more generally, a tape library 200 may include a number of tape drives (e.g., 210, 212, 214, . . . 218) and a number of slots (e.g., 220, 222, . . . 248) that may house tapes. The tapes may be moved back and forth between the slots and the tape drives. The tape drives, slots for storing tapes, and tapes (media) that can be placed in the tape drives can be logically grouped in a logical representation that may be referred to as an application representation. Tape library 200 may present N different application representations to M different applications, N and M being integers. Some tapes and slots in a tape library can be held back as a "carve out" that is not directly visible to or available to an application.

The carve out may be referred to as a library managed partition. In one conventional application, the carve out is used to perform media scanning associated with extended data life management (EDLM). The media scanning may, for example, identify whether a tape is good, is suspect, or has failed. In another conventional application, the carve out may function as an automated media pool that has a few extra slots or tapes just in case a logical representation runs out of space or another potential emergency occurs. In yet another conventional application, the carve out may be used to analyze tapes to discover properties including, encryption level, encryption type, file system type, tape format, and others.

EDLM may include performing different types of scans (e.g., level 1, level 2, level 3) that may take various amounts of time (e.g., 5 minutes, 20 minutes, 120 minutes). EDLM may perform actions that conventionally an application has not necessarily cared about, but that a tape library owner or administrator cared about. For example, EDLM may scan tapes to determine whether they are good, suspect, or failing.

EDLM may be controlled by a policy. A policy may include two parts. A first EDLM policy part may be a control part that identifies facts including, but not limited to, when a tape is to be scanned, how a tape is to be scanned, and which tape is to be scanned. A second EDLM policy part may be a results part that identifies what to do (e.g., notify, report) for different possible scan results (e.g., good, suspect, failed). EDLM policies may be established on a per representation basis.

EDLM may involve multi-level media scanning capabilities for vaulted tapes. EDLM may automate integrity checking of tapes that reside in a tape library (e.g., Scalar i6000), which may improve resiliency. EDLM enables policies to be set to automate scanning of archived data in a tape library. An archived tape can be proactively scanned, regardless of whether it contains primary data or offsite data. When the carve out is available, EDLM may operate concurrently, in the background, to allow tapes to be scanned without impacting regular library operations.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example apparatus and methods change a tape library from being just a receiver of commands to an entity that may also issue a command. A command may be, for example, a directive that an action is to be taken. The directive may take different forms including, but not limited to, an executable instruction, an instruction that can be compiled and then executed, an electrical signal, and an identifier of an executable instruction that can be executed. The difference between a command and data is that data provides information while a command provides a direction to do something (e.g., take an action). While data can be analyzed and then a decision can be made to do something, in one example a command is something that generates an action on its own.

The command may be issued, for example, to an application associated with the tape library. Conventionally, in response to a media scan performed as controlled by an EDLM policy, the tape library could send a notification or a report to an application based on the media scan result (e.g., good, suspect, failed). Example apparatus and methods add the ability for the tape library to take an additional action based on the media scan result. For example, the tape library may be configured to issue a command to an application. The command may take the form, for example, of a copy media command. In one example, the tape library can issue the copy media command using an application interface that is exposed to and available to the tape library. In one embodiment, a tape library is configured to issue the "copy media" command to a StorNext application using the StorNext application programming interface (SNAPI). This transforms the tape library from a target element to an active element. In one embodiment, configuring the tape library to be able to invoke a command through an application programming interface (API) may include adding circuitry to a tape library controller, reprogramming the tape library controller, or adding an expansion chip (e.g., PROM) to a tape library controller.

In one embodiment, the receiving application (e.g., StorNext) may choose to act on or to ignore the command. For example, the receiving application may decide to take actions including, performing the media copy as requested, performing a modified (e.g., partial) media copy, performing a clean and copy, scheduling a copy media command for a later time, and not performing the media copy.

Figure 1:
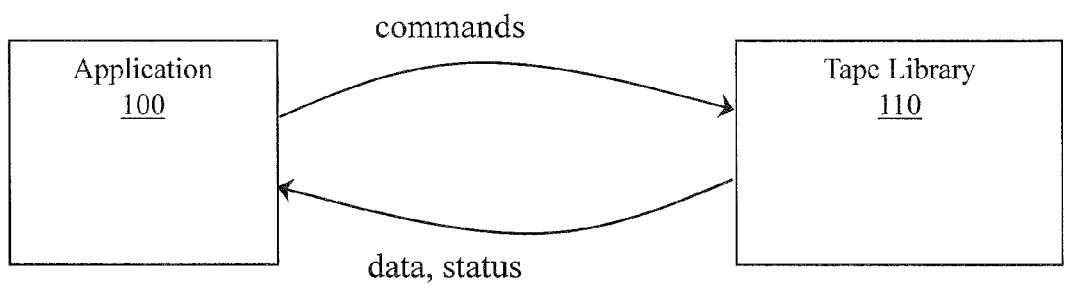
FIG. 1 illustrates an application providing commands to a tape library and the tape library providing data or status to the application.
Figure 2:
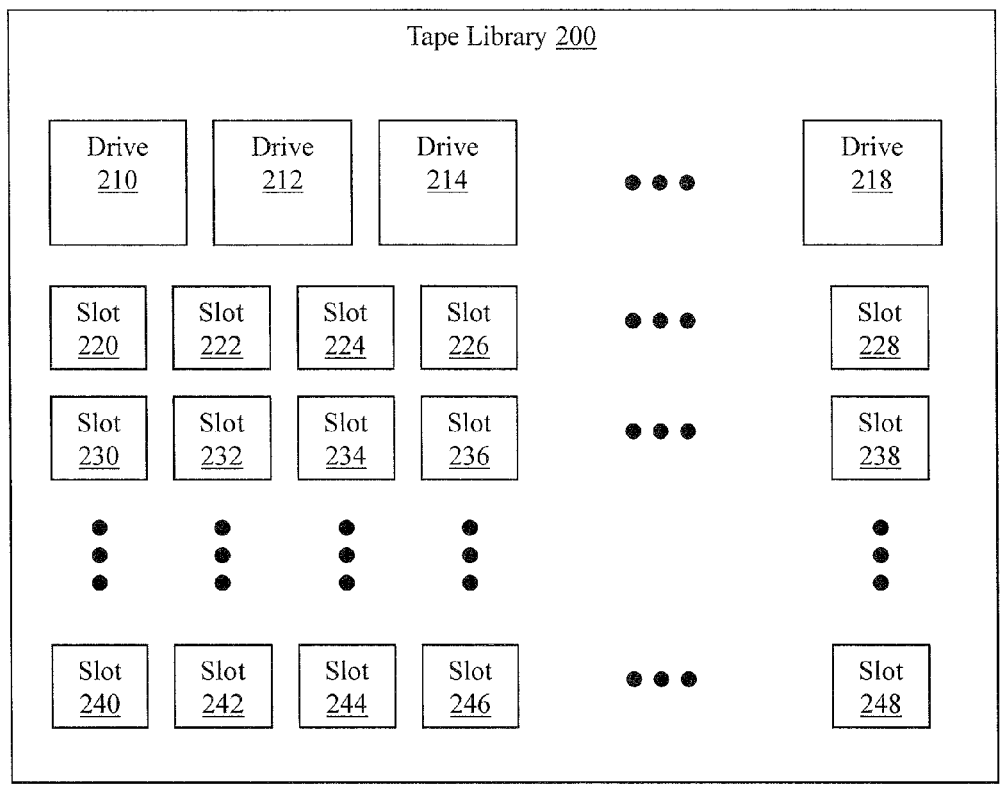
FIG. 2 illustrates a tape library.
Figure 3:
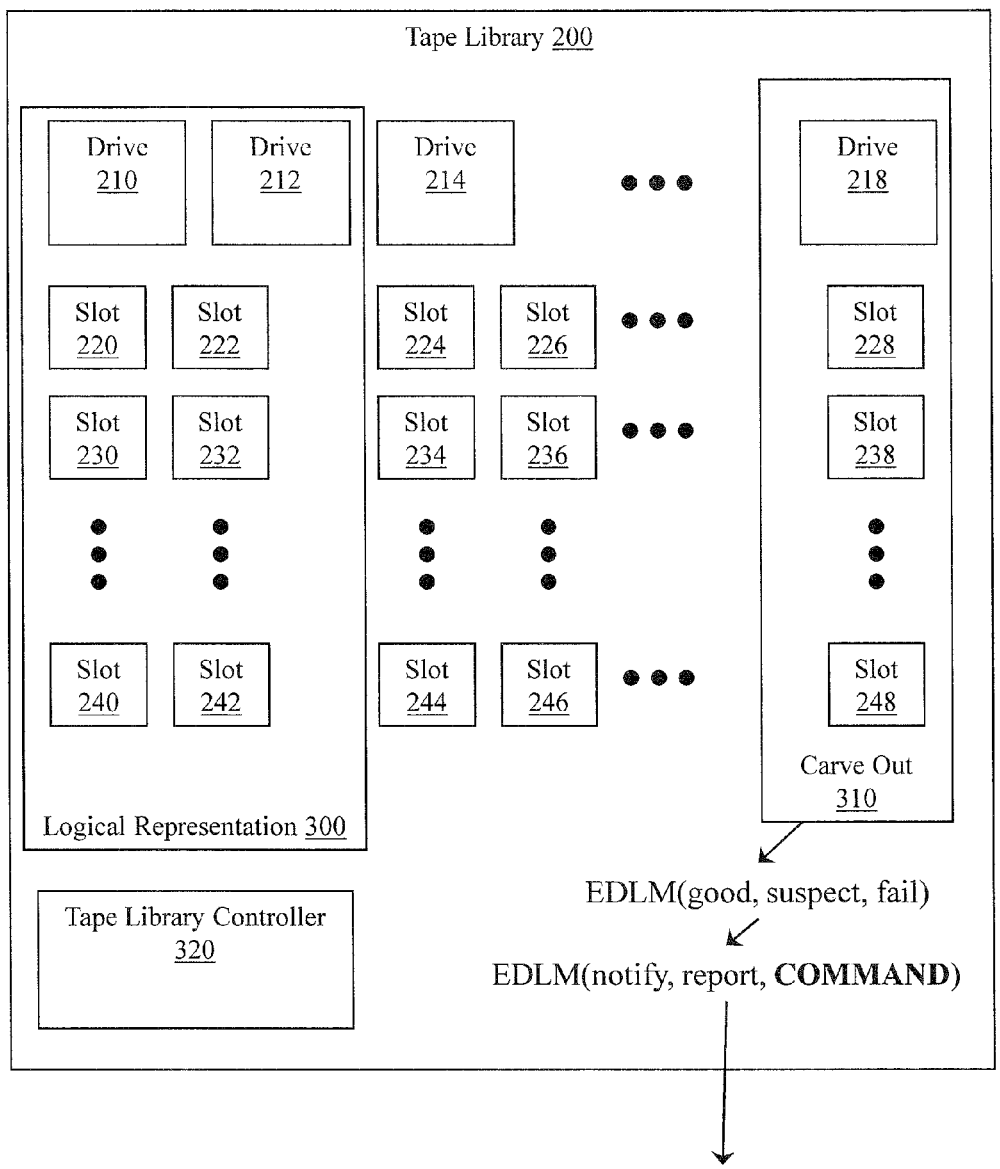
FIG. 3 illustrates a tape library presenting a logical representation to an application and providing a command.

More generally, example apparatus and methods concern configuring a tape library to be able to issue a command to an application associated with the tape library rather than simply being able to provide data stored on a tape or status information about the tape or its data. Thus, example apparatus and methods concern configuring a tape library to be a command initiator rather than just a command receiver. FIG. 3 illustrates tape library 200 configured with a tape library controller 320. Tape library 200 is illustrated presenting a logical representation 300 that includes a set of tape drives and slots. Tape library 200 is also illustrated with a carve out 310. Tape library 200 is also illustrated monitoring an extended data life management operation (e.g., scan media) that may return different results (e.g., good, suspect, fail) and is also illustrated taking an extended data life management action based on the result. The action may include the conventional actions of providing a notification or report. The action may also include issuing a command from the tape library 200. Conventional tape libraries do not issue commands.

Figure 4:
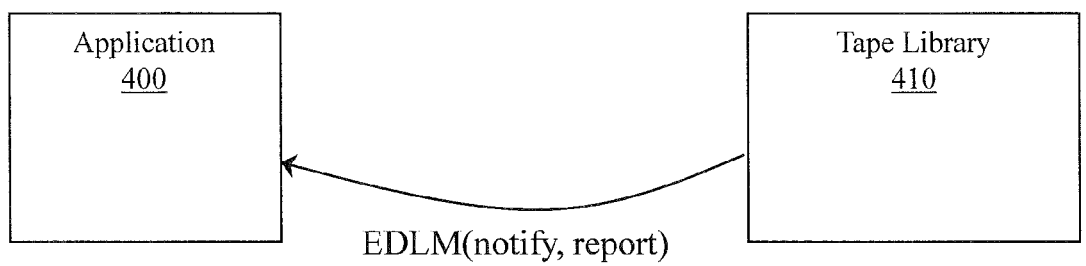
FIG. 4 illustrates a tape library providing conventional extended data life management results to an application.

FIG. 4 illustrates a conventional tape library 410 performing a conventional extended data life management action of providing a notification or report to an application 400. The notification may provide data identifying, for example, a state for a tape (e.g., passed, failed). The report may also provide data identifying, for example, attributes of a tape (e.g., percent filled, percent available, age, metadata). Both the notification and report are information about a tape or a condition.

Figure 5:
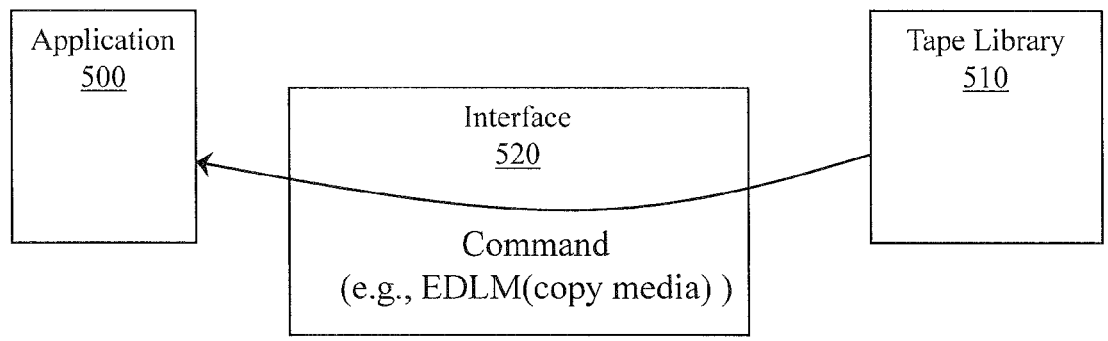
FIG. 5 illustrates a tape library providing a command to an application.

FIG. 5 illustrates an example tape library 510 performing an additional extended data life management action of providing a command (e.g., copy media) to an application 500. The command is unlike the conventional notification or report because the command identifies an action to be taken rather than providing passive information. Rather than the tape library 510 simply reporting a condition or state, the tape library 510 issues a command that has the intention of initiating the occurrence of an action.

Conventionally, a tape library only received commands and only provided data or reports. However, example application 500 may provide an interface 520 (e.g., application programming interface (API)) that makes it possible for tape library 510 to issue a command through the interface. Providing the interface may include, for example, establishing sockets to which the tape library 510 can write, establishing inter-process communication ports to which the tape library 510 can write, establishing callback addresses that a process executing on the tape library 510 can utilize, or providing executable code that can execute on the tape library 510 where the executable code knows how to interface with the application 500.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 6:
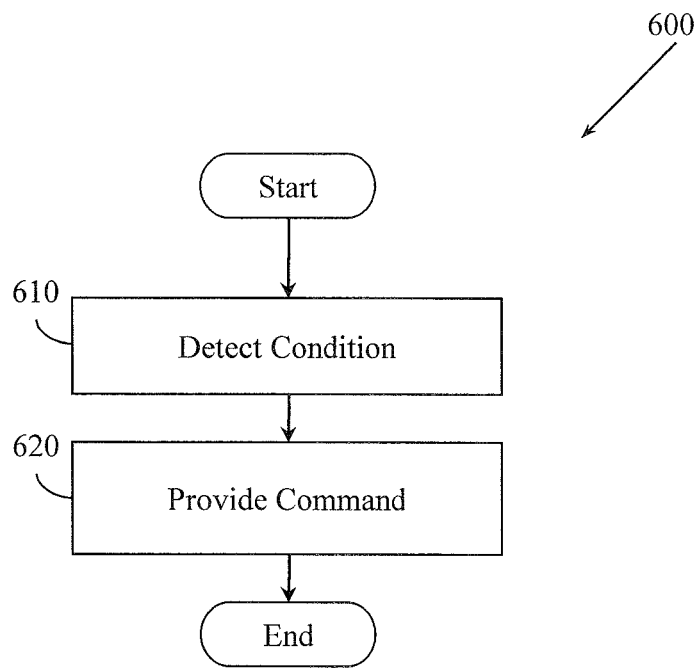
FIG. 6 illustrates a method associated with a tape library providing a command to an application.

FIG. 6 illustrates a method 600 associated with a tape library initiated action. Method 600 includes, at 610, configuring a tape library to detect a condition present in the tape library. Configuring the tape library may include, for example, executing a computer program, installing a circuit, installing a memory (e.g., programmable read only memory (PROM)), reprogramming a programmable memory (e.g., electrically erasable PROM) in a tape library controller associated with the tape library, executing an applet on the tape library controller, reprogramming an operating system executing in the tape library, reprogramming a control program executing in the tape library, establishing a callback mechanism for the tape library, establishing a remote procedure callback mechanism for the tape library, or other actions.

The condition detected in the tape library may be, for example, the performance of a media scanning operation (e.g., tape scanning operation), the completion of a media scanning operation, the failure of a media scanning operation, or other condition.

The tape library may include, for example, a physical tape drive, a physical slot configured to hold a physical tape, and one or more physical tapes. The physical tapes may be movable from slots to tape drives and back. One example tape library is the Scalar I40 tape library. More generally, other Scalar tape libraries, and other tape libraries may be employed. In one embodiment, the tape scanning operation may be performed in a carve out available in the tape library. Thus, the tape scanning operation may be performed using a tape drive not present in an application representation.

Method 600 also includes, at 620, controlling the tape library to issue a command to an entity external to the tape library in response to detecting the condition. When the condition is, for example, a tape scan that reveals a tape that has failed, the command issued may be a copy media command. When the condition is, for example, a tape scan that reveals a tape that is suspect, the command issued may be a clean and copy command.

While "copy media" and "clean and copy" commands are described, more generally the tape library may issue a command that is available to the tape library. The command may be available to the tape library because an application may have made the command available through, for example, an application programming interface. Thus, in one example, controlling the tape library to issue a command involves invoking a command exposed to the tape library through an application programming interface associated with the entity external to the tape library.

Since the command may be available due to an application, in one embodiment, the media scanning operation may be an extended data life management operation that is associated with an application representation provided by the tape library. Recall that an application representation is a logical grouping of a tape drive or drives, a slot or slots, and a tape or tapes forming part of the tape library.

In one example, the entity external to the tape library is a data management application. In different embodiments the data management application may provide content sharing, data archiving, or data de-duplication. The sharing, archiving, and de-duplication may be provided, for example, for a shared file system. In one embodiment, the application and shared file system may be configured to operate in a storage area network. In one embodiment, the external entity may be the StorNext application and the application programming interface may be the StorNext application programming interface (SNAPI).

While FIG. 6 illustrates various actions occurring in serial, it is to be appreciated that various actions illustrated in FIG. 6 could occur substantially in parallel. By way of illustration, a first process could detect conditions in the tape library and a second process could provide a command to an entity external to the tape library. While two processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform methods described herein including method 600. While executable instructions associated with the above method are described as being stored on a computer-readable medium, it is to be appreciated that executable instructions associated with other example methods described herein may also be stored on a computer-readable medium.

Figure 7:
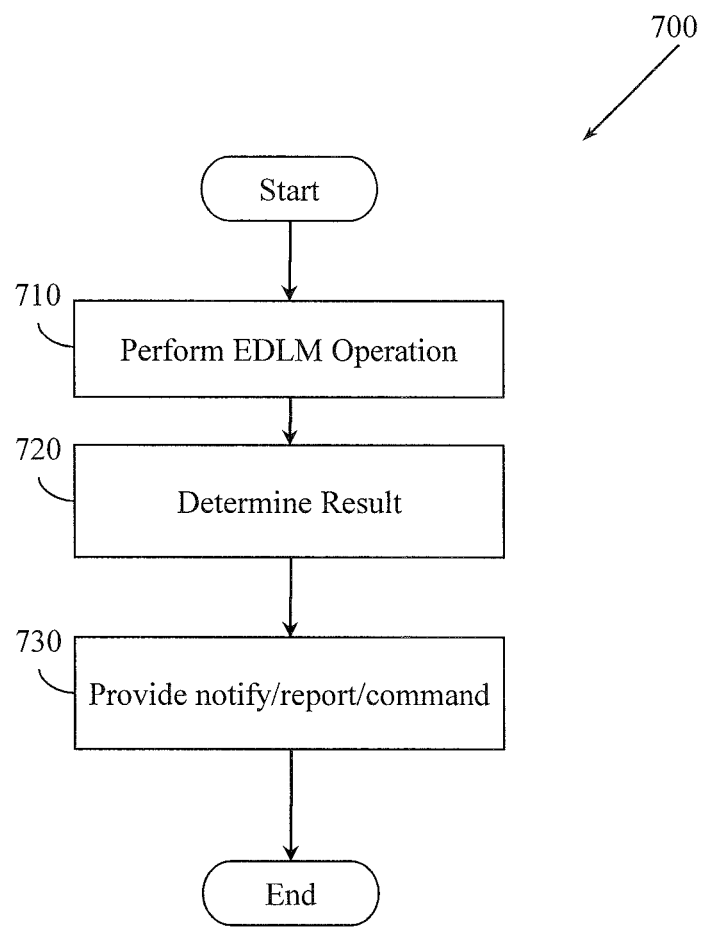
FIG. 7 illustrates a method associated with a tape library providing an extended data life management copy media command.

FIG. 7 illustrates a method 700 associated with a tape library initiated action. Method 700 includes, at 710, controlling a tape library to perform a media scanning operation associated with an extended data life management policy. The media scanning operation may be, for example, a tape scanning operation. On different tape libraries different tape scanning operations may be available. For example, a first tape drive may have two levels of tape scanning, each of which can return a Boolean (e.g., pass/fail) result, while a second tape drive may have four levels of tape scanning that can return more than just a pass/fail result. An application may wish to take different actions based on the different results available for the different levels of scanning. Thus, the media scanning operation may be controlled, at least in part, by an extended data life management policy created and/or controlled by an application that is using the tape library.

In one example, the extended data life management policy controls which tape is to be scanned, when to scan the tape, how to scan the tape, and other actions. In one embodiment, the extended data life management policy may also control whether status concerning the result will be provided to the application or whether the command will be issued to the application. As described above, a tape library may include a number of tape drives, slots, and tapes. Thus, in one embodiment, the extended data life management policy may be associated with an application representation associated with the tape library, where the application representation presents to the application a logical set of tape drives, slots, and tapes. The logical set of tape drives, slots, and tapes may represent less than the total set of tape drives, slots, and tapes in the tape library.

Method 700 also includes, at 720, determining a result of the media scanning operation. As described above in connection with action 710, different tape drives may support different tape scanning operations and thus determining the result may include comparing the result or mapping the result to categories established in the extended data life management policy. In one example, the media scanning operation is performed on a tape that is not currently in use by the application and is performed using a tape drive that is not a member of an application representation available to the application. Thus, in one example, the media scanning operation may proceed in parallel with normal tape library operations.

Method 700 also includes, at 730, selectively controlling the tape library to provide status concerning the result to an application external to the tape library or selectively controlling the tape library to issue issuing a command to the application. The method 700 may control the tape library to provide status when the tape scan indicated that the tape was in a first state (e.g., good state) and the method 700 may control the tape library to issue a command when the tape scan indicated that the tape was in a second, different state (e.g., suspect, failed). In one example, the application may be a data management application that provides features including, but not limited to, content sharing, data archiving, and data de-duplication. In one embodiment, the application may provide these services for a shared file system configured to operate in a storage area network. An example application is StorNext by Quantum.

The application may have different commands available for use with the tape library. In one example, the command is a copy media command that is available for invocation by the tape library through an application programming interface (API) provided by the application. In another example, the command is a remove media command that is also available for invocation by the tape library through the API. In one example, the application is StorNext and the API is SNAPI.

Figure 8:
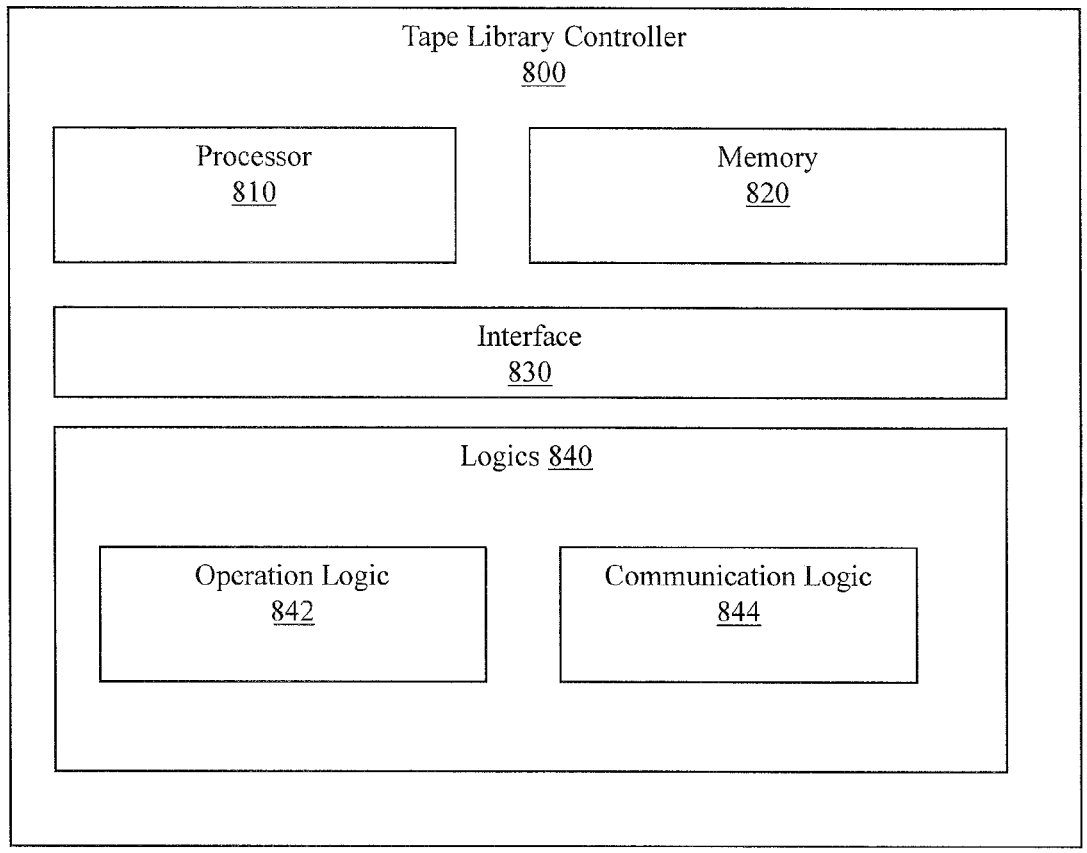
FIG. 8 illustrates a tape library configured to provide a command to an application.

FIG. 8 illustrates a tape library controller 800 associated with a tape library initiated action. Tape library controller 800 includes a processor 810, a memory 820, a set 840 of logics, and an interface 830 to connect the processor 810, the memory 820, and the set 840 of logics. The set 840 of logics may include an operation logic 842 and a communication logic 844.

Tape library controller 800 may be configured to control an operation of a tape library. The tape library may include a tape drive, a tape slot configured to hold a tape suitable for use in the tape drive, and the tape library controller 800.

In one embodiment, the operation logic 842 may be configured to control the operation. The operation may be, for example, a media scanning operation (e.g., tape scan operation). Controlling the operation may include, for example, determining which tape to scan, determining when to scan a tape, determining how a tape is to be scanned, and determining what to do in response to certain results being obtained from the tape scan.

Since different tape libraries may have different tape drives with different capabilities and since different tape libraries may have different tapes that support different operations, and since different applications may interact with different tape libraries or different application representations from different tape libraries, the media scanning operation may be controlled by a policy. In one example, a policy may be established by a user directly with the library via, for example, a library graphical user interface (GUI). In another embodiment, the policy may be established on a per application representation basis by an accessing application via, for example, a command line interface (CLI) or application programming interface (API) that facilitates managing a policy. The policy may describe one or more of, a tape to be scanned, a time to scan the tape, an approach for scanning the tape, and a command to be issued upon detecting a specified result of performing the tape scanning operation.

In one embodiment, the communication logic 844 is configured to communicate a command to an external computerized user of the tape library. The command may be, for example, a copy media command. While a copy media command is described, more generally the communication logic 844 may be configured to communicate a command that has been made available to the tape library controller 800 by an external entity. The command may have been made available by registering a callback address with the communication logic 844, by providing a socket to which the communication logic 844 can write, providing a pipe to which the communication logic 844 can write, by providing an electrical connection over which the communication logic 844 can send an electrical signal (e.g., interrupt signal), and in other ways.

In different embodiments, the operation logic 842 or the communication logic 844 can be circuits, non-transitory computer memories storing computer-executable instructions, or other physical items. In one embodiment the operation logic 842 or the communication logic 844 may be retrofit onto an existing tape library controller. In another embodiment, the operation logic 842 or the communication logic 844 may be manufactured into a new tape library controller. In one embodiment, the operation logic 842 or the communication logic 844 may already exist on a tape library controller and may be performing a first role and thus may be reprogrammed to perform the new roles that facilitate having a tape library provide a command rather than just receive commands.

Figure 9:
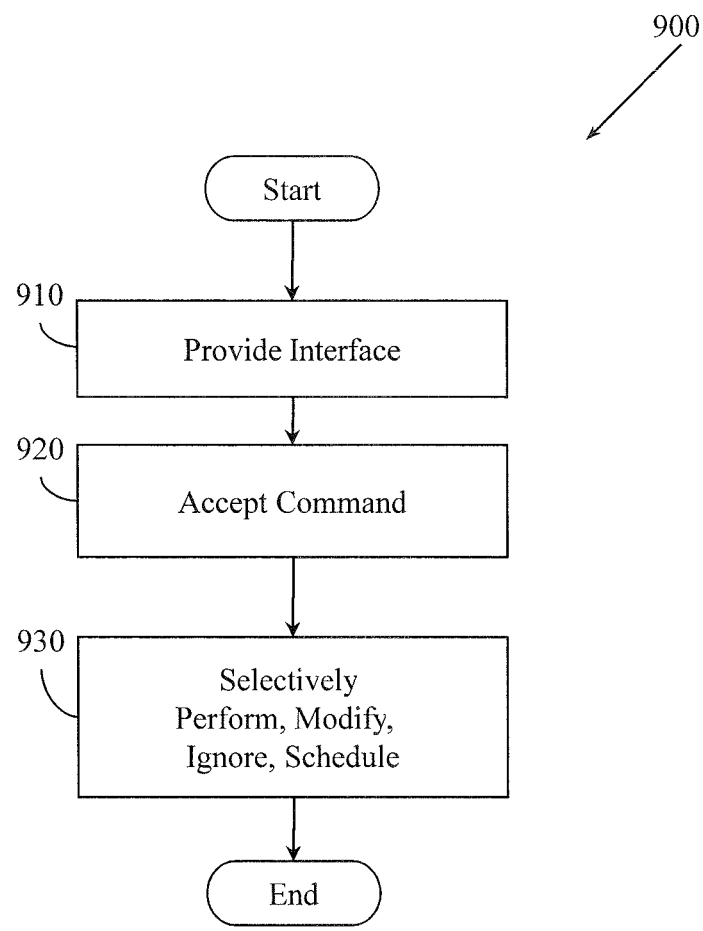
FIG. 9 illustrates a method performed by an application interacting with a tape library.

FIG. 9 illustrates a method 900 associated with a tape library initiated action. In one embodiment, method 900 may be performed by an application configured to perform data replication, data sharing, data de-duplication, or other actions. Method 900 may be performed by an application that has exposed an interface to a tape library that has exposed an application representation to the application. In one embodiment, method 900 may be performed by a storage manager associated with StorNext, and the interface exposed to the tape library may be SNAPI.

Method 900 includes, at 910, providing an interface to a tape library. Providing the interface may include, for example, establishing sockets to which the tape library can write, establishing inter-process communication ports to which the tape library can write, establishing callback addresses that a process executing on the tape library can utilize, providing executable code that can execute on the tape library where the executable code knows how to interface with the application, or other actions. Regardless of how the interface is provided, the provided interface is configured to allow the tape library to be able to invoke a command associated with the application. The command may be, for example, a copy media command. While a copy media command is described, more generally, the provided interface allows the tape library to invoke commands exposed to and made available to the tape library. Since different applications may be interested in taking different actions when different conditions are detected in a tape library, different applications may expose different commands through different interfaces.

Method 900 also includes, at 920, accepting a command invoked through the interface by the tape library. Even though the command is accepted, the application may not simply blindly perform the command. This allows an application to take one action at one point in time with one tape library upon receiving a command from the tape library and to take a second, different action at a different point in time or with a different tape library upon receiving a command. Thus, method 900 also includes, at 930, selectively ignoring the command, performing the command as issued, performing a modified version of the command, scheduling the command to be performed at a future time, or other actions.

In one example, method 900 also includes setting a media scanning policy via the tape library. Setting the media scanning policy may include, for example, using a tape library interface to describe actions including, but not limited to, which tape to select for scanning, which tape to scan, when to scan a tape, and a tape scanning approach.

In one example, method 900 also includes providing a media scanning policy to the tape library, where the media scanning policy controls actions including, but not limited to, tape selection for scanning, tape scanning scheduling, tape scanning approach, and command issuance from the tape library to the application.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
controlling a tape library to perform a media scanning operation associated with an extended data life management policy, where the media scanning operation is performed on a tape that is not currently in use by an application and where the media scanning operation is performed using a tape drive that is not a member of an application representation available to the application, where the application is a data management application that provides content sharing, data archiving, and data de-duplication for a shared file system configured to operate in a storage area network;
determining a result of the media scanning operation; and
selectively controlling the tape library to perform one of:
providing status concerning the result to an application external to the tape library; and
issuing a command to the application external to the tape library, where the command is a copy media command that is available for invocation by the tape library through an application programming interface provided by the application external to the tape library, and where the copy media command is issued upon determining that the result indicated a failure of the media scanning operation.

2. The method of claim 1, where the extended data life management policy controls one or more of, selecting a tape to be scanned, when the tape is to be scanned, and how the tape is to be scanned.

3. The method of claim 2, where the extended data life management policy also controls one or more of, whether status concerning the result will be provided to the application, and whether the command will be issued to the application.

4. The method of claim 3, where the extended data life management policy is associated with an application representation associated with the tape library, where the application representation presents to the application a logical set of tape drives, slots, and tapes, the logical set of tape drives, slots, and tapes comprising less than the total set of tape drives, slots, and tapes in the tape library.

* * * * *